March 11, 1930.　　　W. E. SYKES　　　1,750,029
METHOD OF CUTTING GEAR TEETH
Filed May 24, 1923　　　9 Sheets-Sheet 2

Inventor
William E. Sykes
By Henry E. Rockwell
Attorney

March 11, 1930.  W. E. SYKES  1,750,029
METHOD OF CUTTING GEAR TEETH
Filed May 24, 1923   9 Sheets-Sheet 4
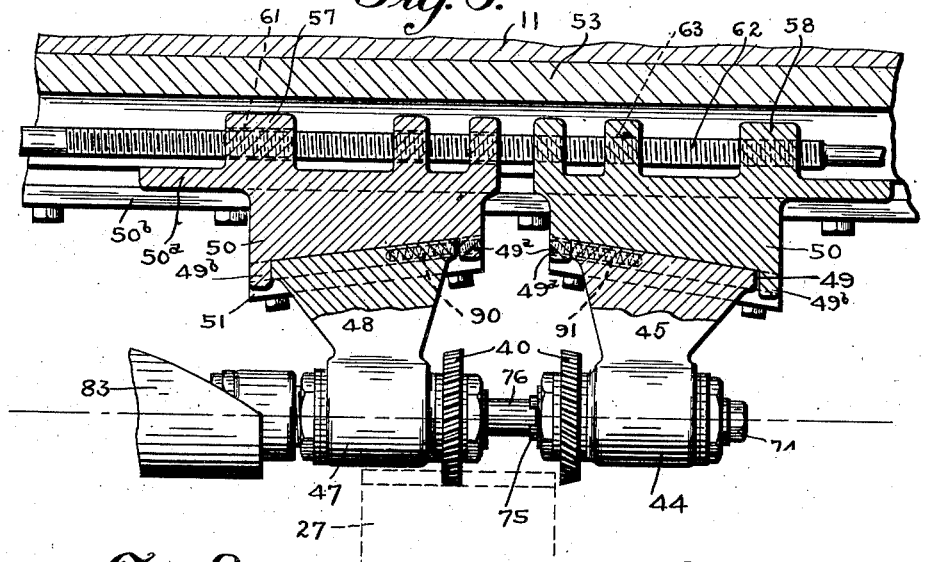
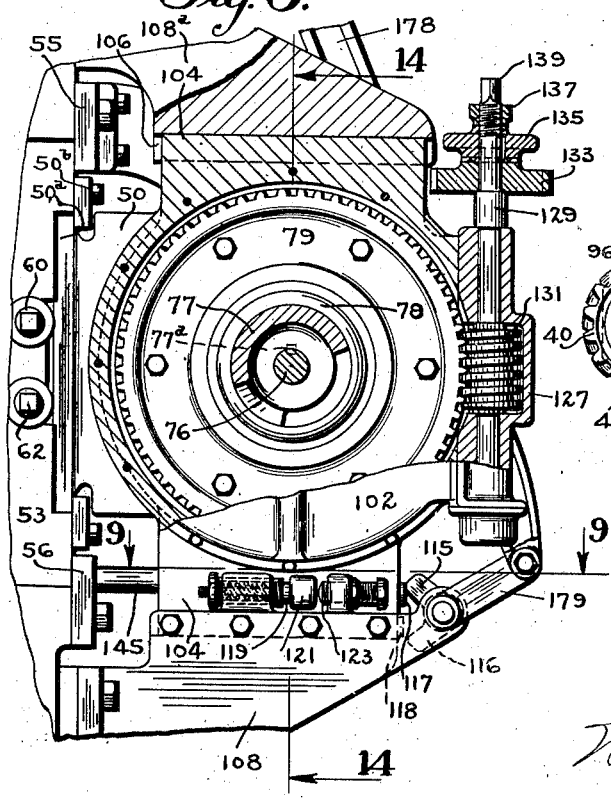
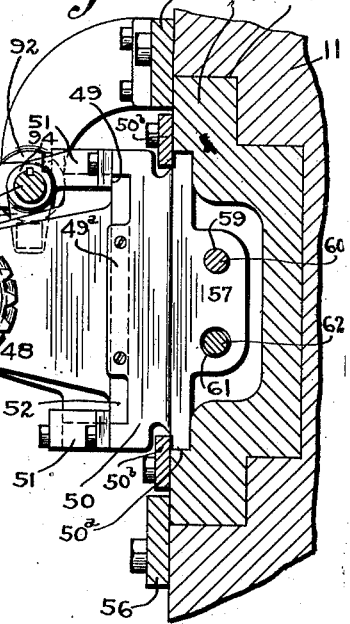

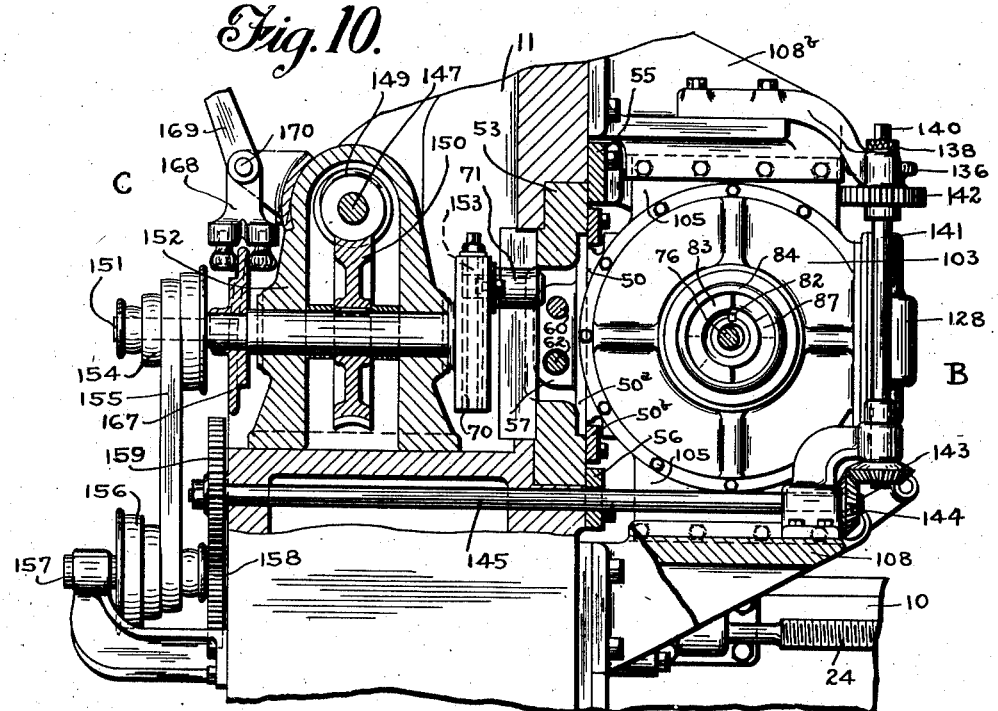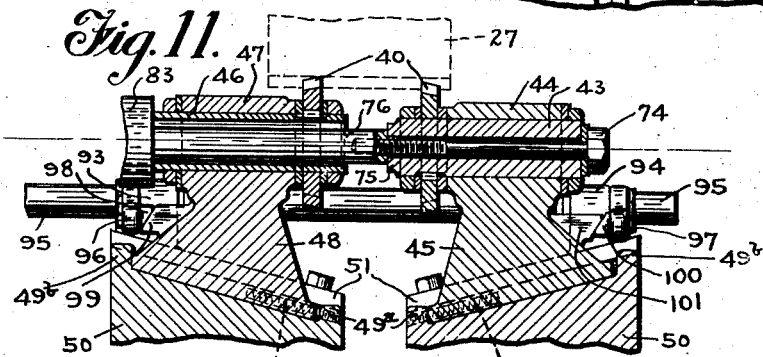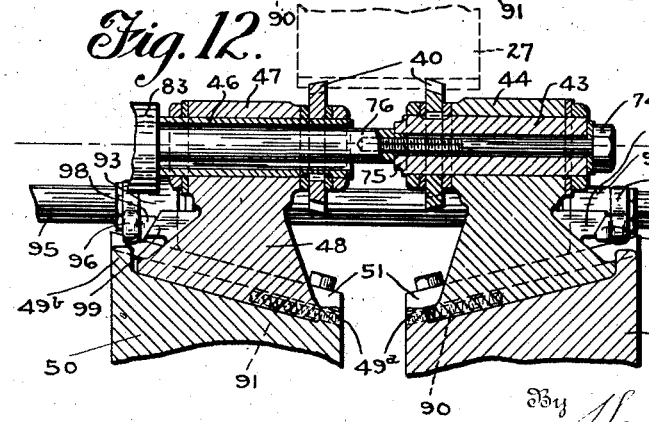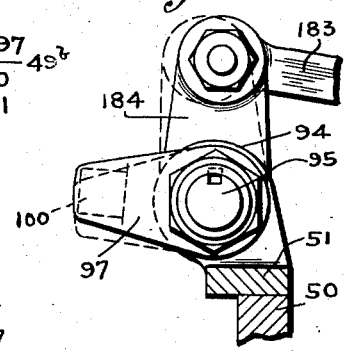

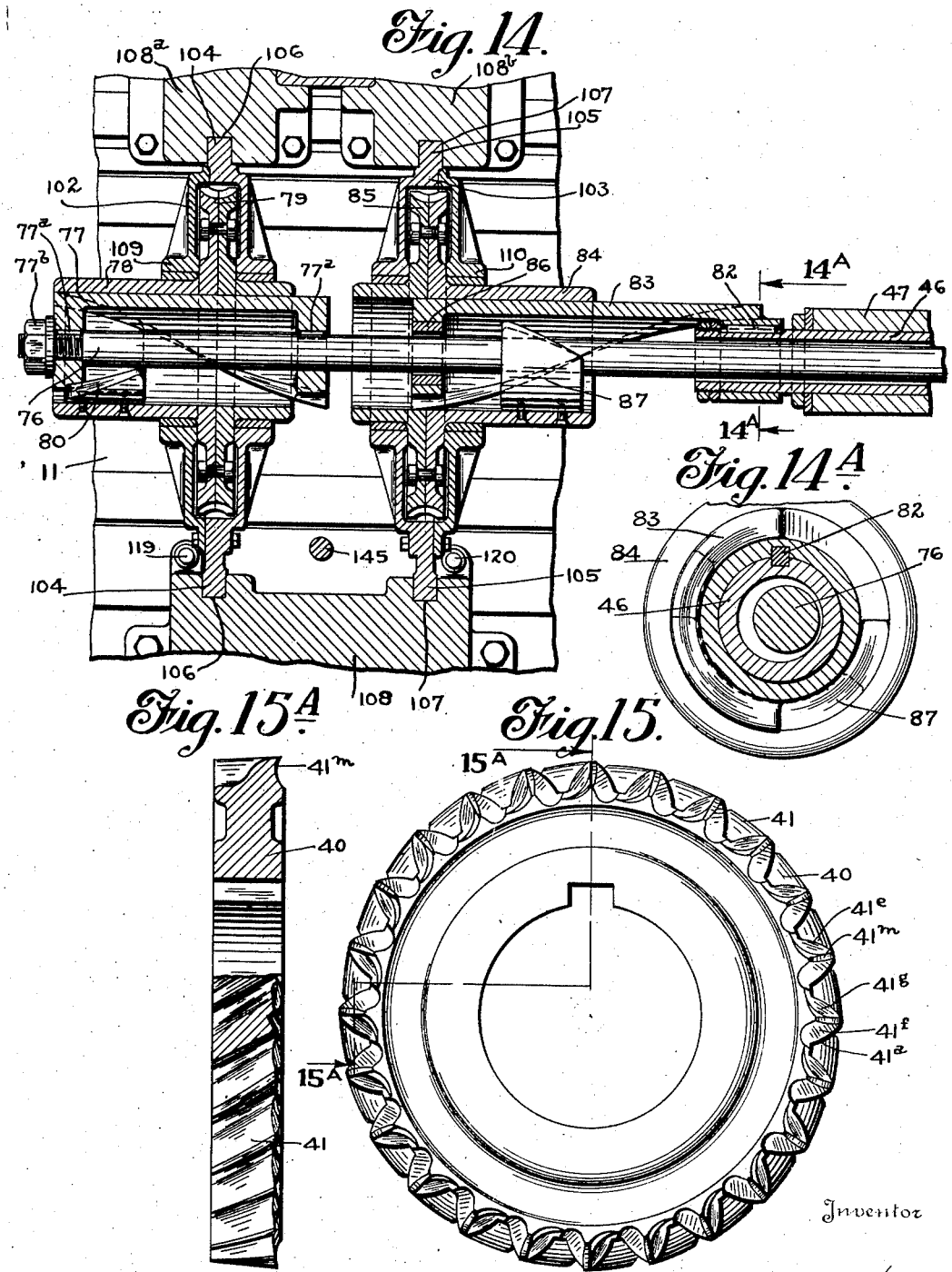

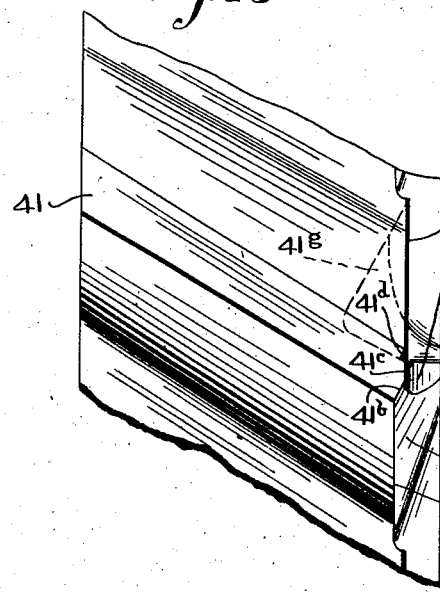
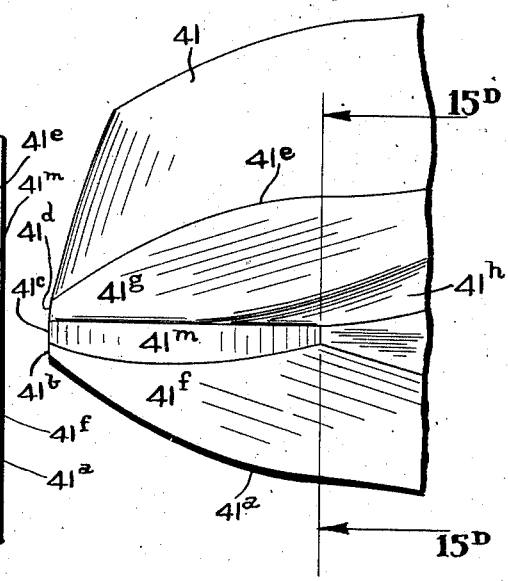
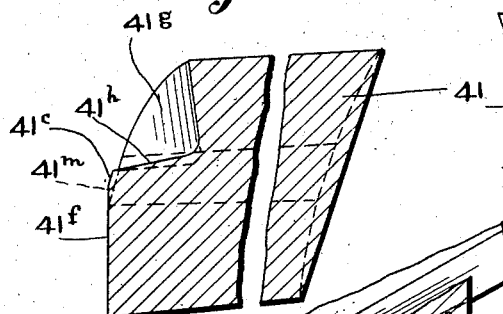
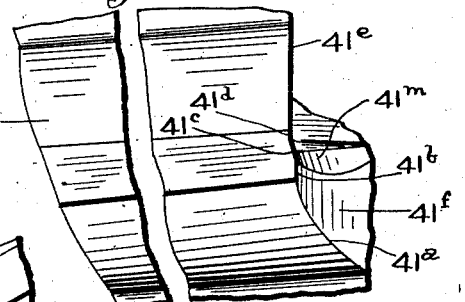
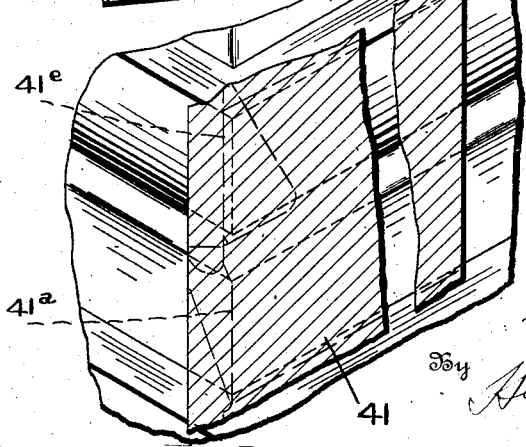

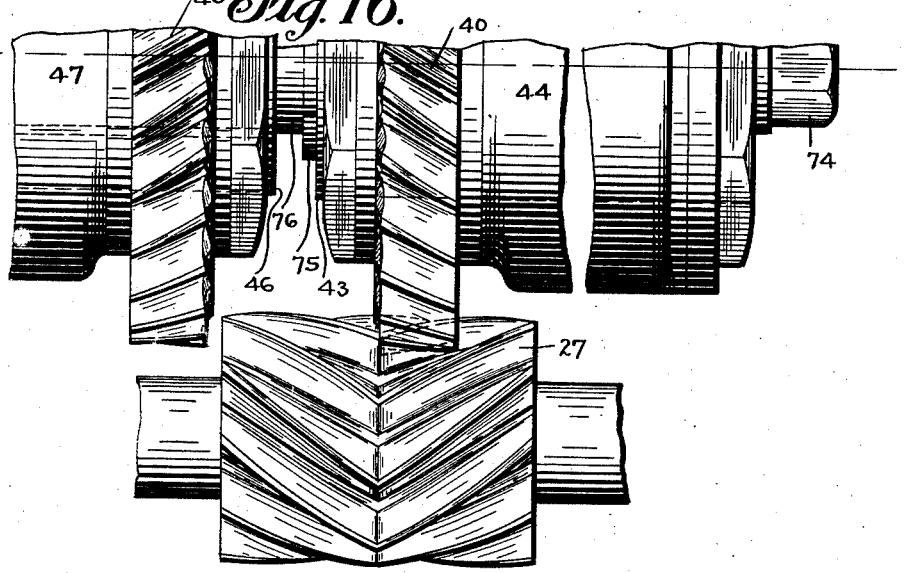
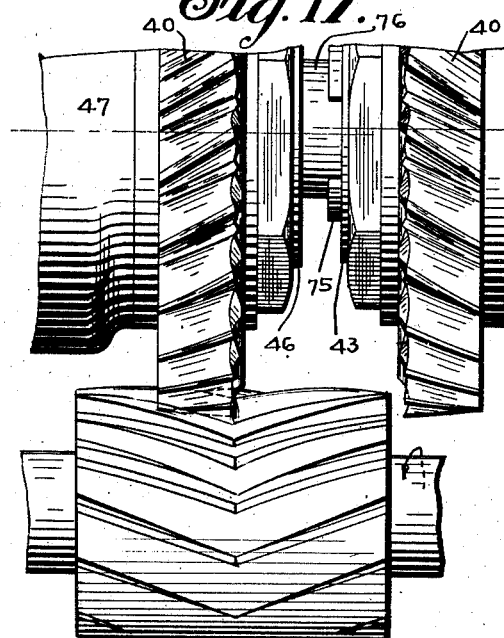
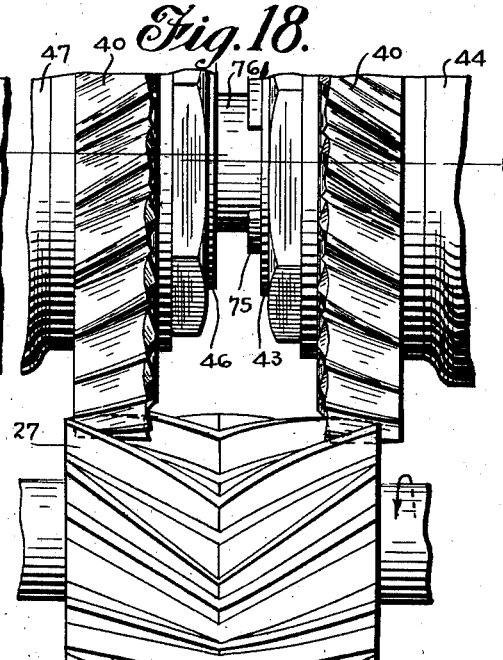

Patented Mar. 11, 1930

1,750,029

UNITED STATES PATENT OFFICE

WILLIAM EDWIN SYKES, OF SLOUGH, ENGLAND

METHOD OF CUTTING GEAR TEETH

Application filed May 24, 1923, Serial No. 641,125, and in Great Britain August 30, 1920.

This invention relates to improvements in methods of forming the teeth of gears, and while the invention comprises certain features which will be found advantageous in cutting straight tooth gears, such as spur wheels and pinions, for example, and in cutting furrows in the surface of metal cylinders of many types, it is more particularly concerned with the cutting of helical gear teeth and is readily applicable to the cutting of either single or double helical teeth in the periphery of a gear blank.

One object of my invention is the provision of a method whereby double helical or herringbone teeth, running continuously across the gear face, can be cut in the blank in a commercially practical and satisfactory manner.

Another object of my invention is to provide a method by which double helical or herringbone gears with continuous teeth, may be cut by the use of a pair of cutters advancing toward the center of the blank face from opposite sides thereof respectively, and so arranged that each cutter will advance substantially to the center of the gear or apex of each tooth and then be returned to its original position, in order that the teeth may be continuously formed across the face of the gear.

It is also proposed to furnish a method whereby the apices or angles of continuous herringbone teeth can be cut in a clean and accurate fashion.

Another object of my invention is the provision of a method of the character described, which permits of great accuracy in the formation of gear teeth while requiring a minimum amount of attention on the part of the operator.

Other objects are to provide for the proper relief of the cutter at the end of the cutting strokes; to evolve a method for cutting gear teeth in which a cutter of gear wheel or pinion formation, and the blank to be operated upon, are given continuous rotary generating movements of substantially equal peripheral velocities; and to improve generally and in detail the procedure in the production of helical tooth and other gears.

Generally speaking, my improved method as applied to the production of double helical or herringbone gears, contemplates, preferably, the use of a pair of alternately acting cutters of pinion formation, which are so controlled that each has imparted to it a reciprocatory twisting movement during the cutting stroke, after which it is given a bodily or translatory movement by which the cutter is relieved from the work on the return stroke; and at the same time that each cutter is given this reciprocatory twisting movement for cutting a tooth of the desired angle or obliquity, both the cutter and the work are given a relatively slow continuous rotating movement, so that a continuous cutting or generating operation is effected. Other features, however, hereinafter explained, are of importance in cutting gears of various types and dimensions.

To these and other ends, the invention consists in the novel features and combination of steps to be hereinafter described and claimed.

In the accompanying drawings:

Fig. 3 is a side elevation of the machine;

Fig. 6 is a sectional view through the cutter carriage and carriage slide, on line 6—6 of Fig. 1;

Fig. 7 is a sectional view on line 7—7 of Fig. 1;

Fig. 8 is a sectional view on line 8—8 of Fig. 1;

Fig. 10 is a sectional view on line 10—10 of Fig. 2;

Fig. 11 is a sectional view through the cutter carriages, on line 11—11 of Fig. 1, showing the positions of the cutter carriages as they are being moved toward the right, in this figure;

Fig. 12 is a view similar to Fig. 11, showing the position of the cutter carriages as they are moving in the opposite direction or toward the left, in this figure;

Fig. 13 is a side elevational view of the cam mechanism for assisting the relief of the cutters during their operation;

Fig. 14 is a sectional view through the cutter spindles on line 14—14 of Fig. 8;

Figure 1:
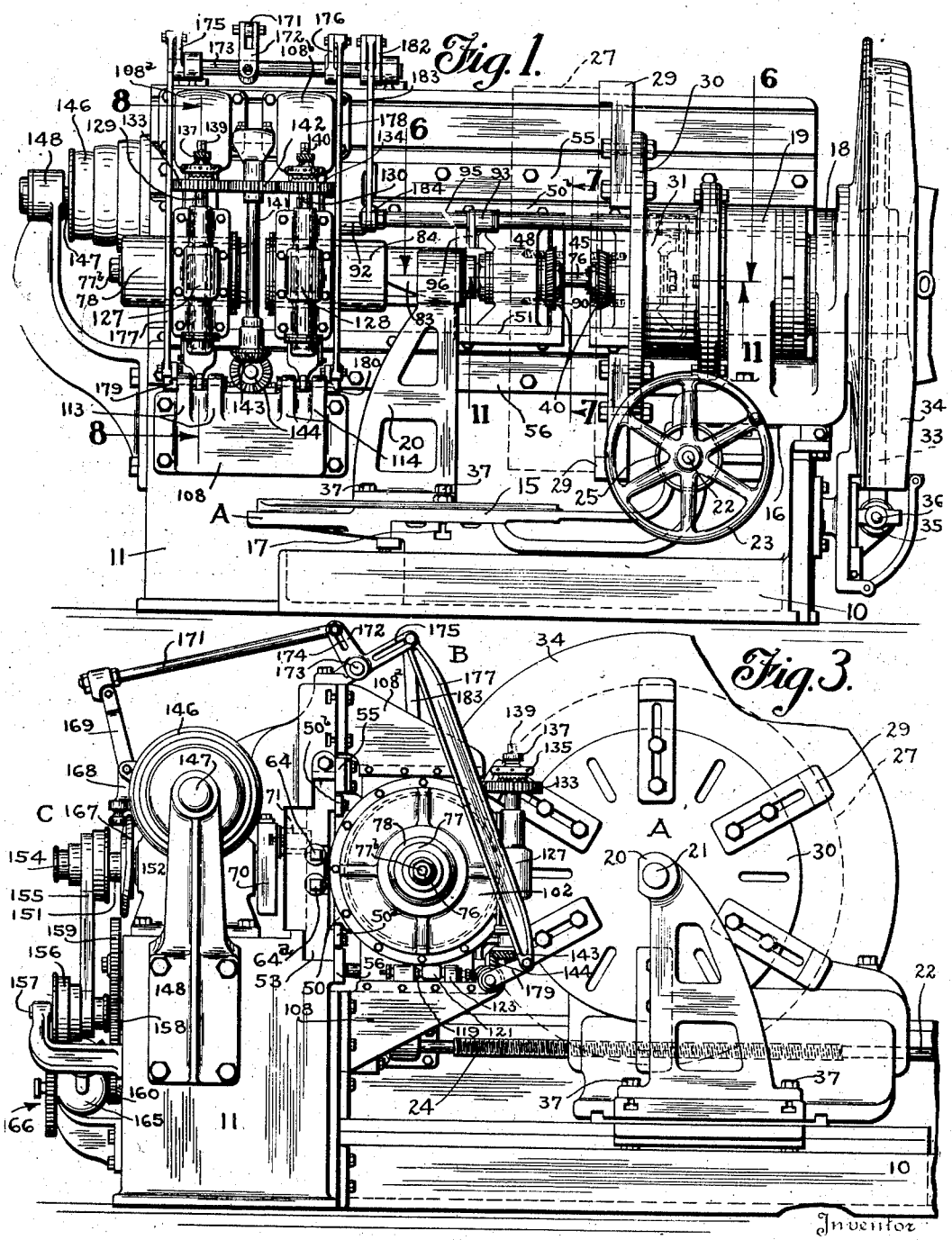
Fig. 1 is a front elevational view of a gear cutting machine, designed to carry out my improved method.
Figure 19:
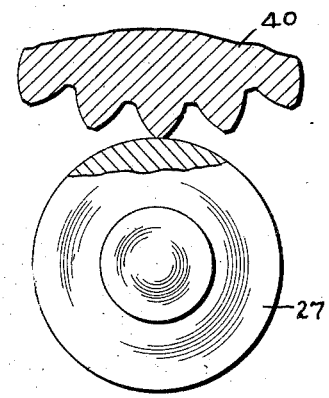
Figure 20:
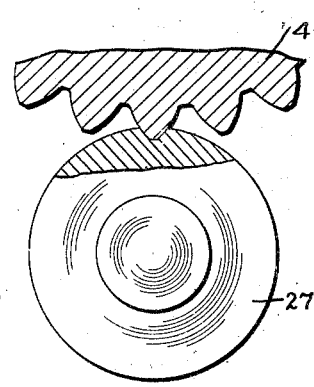
Figure 21:
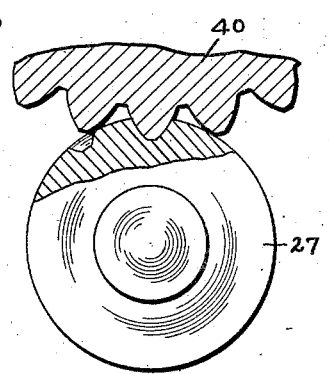
Figure 22:
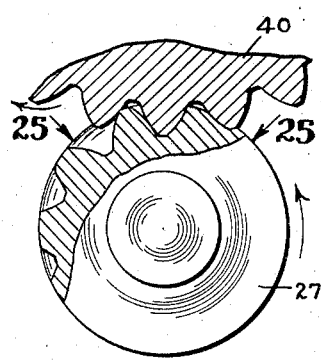
Figure 23:
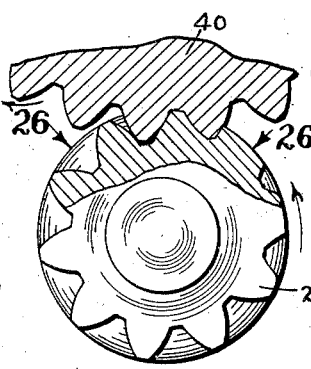
Figure 24:
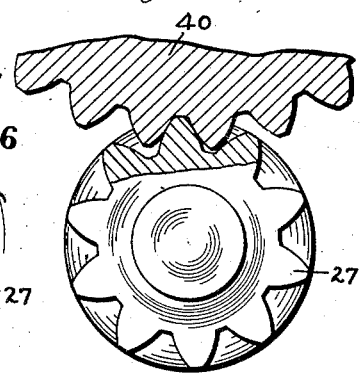
Figure 25:
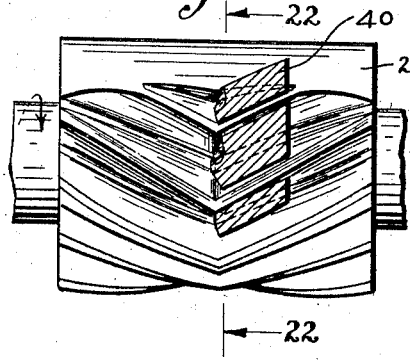
Figure 26:
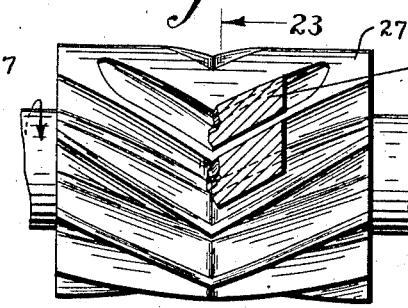

Fig. 14^A is an enlarged transverse sectional view through the cutter spindles on line 14^A—14^A of Fig. 14;

Fig. 15 is a side view of one of the cutters, the view showing the cutting edges of the teeth;

Fig. 15^A is a face view of the cutter, partly in section on line 15^A—15^A of Fig. 15;

Fig. 15^B is an enlarged face view of a portion of the cutter pinion sufficient to show one of the cutting teeth;

Fig. 15^C is an end view of one of the teeth of the cutter;

Fig. 15^D is a sectional view on line 15^D—15^D of Fig. 15^C;

Fig. 15^E is a view of one of the cutter teeth looking along the plane designated by the reference character 41^g on Fig. 15^C;

Fig. 15^F is a view of a portion of the gear blank being operated upon by one of the cutter teeth, the latter being shown in section;

Figs. 16, 17 and 18 are plan views of the cutters in three different positions, and a pinion in different stages of production;

Fig. 19 is a diagrammatic view, showing the operation of cutting the teeth in a blank, the view showing the blank being fed against the teeth of the cutter;

Figs. 20 and 21 are views similar to Fig. 19, showing successive stages in the progress of the work;

Figs. 22 and 23 are sectional views on lines 22 and 23, of Figs. 25 and 26, respectively, showing different stages in the cutting operation;

Fig. 24 shows the completion of the work;

Fig. 25 is a sectional view about the periphery of the blank on line 25—25 of Fig. 22; and Fig. 26 is a sectional view about the periphery of the blank on line 26—26 of Fig. 23.

While my improved method may be carried out by mechanism other than that shown, it will perhaps be best understood by reference to the machine which I have illustrated as a preferred means for carrying out the various steps constituting my invention.

Figure 2:
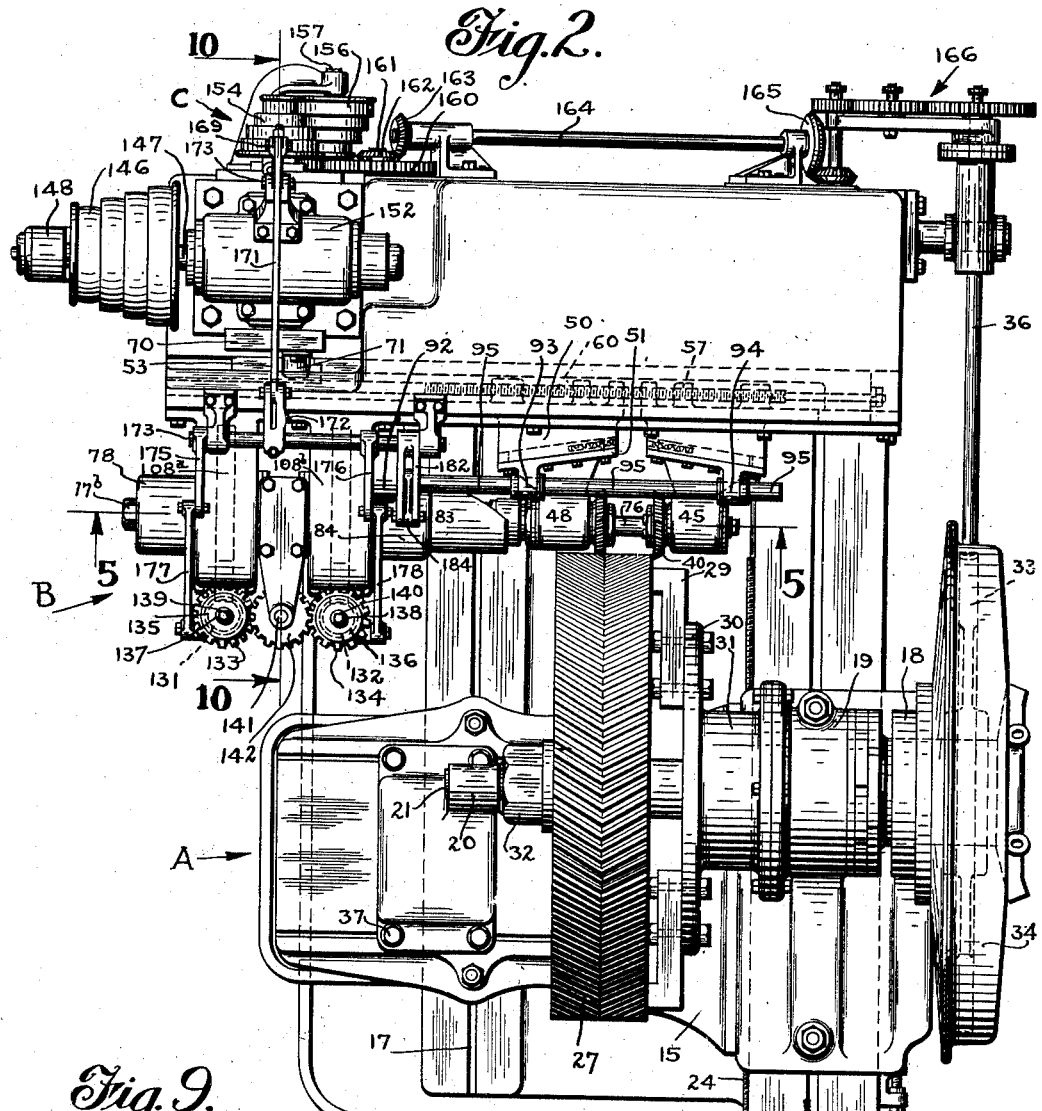
Fig. 2 is a plan view of the same.
Figure 9:
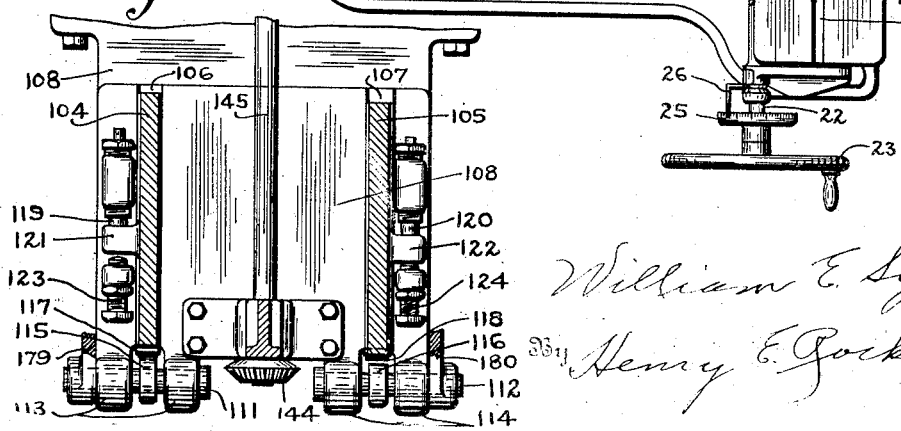
Fig. 9 is a sectional view on line 9—9 of Fig 8, showing the worm wheel casing support.

Referring more particularly to Figs. 1 to 3, the machine consists of a main supporting frame, having a forwardly extending bed plate 10, and a vertically disposed rear standard 11. Upon the bed plate 10 is reciprocably supported a work carriage designated as a whole by the letter "A", while upon the standard 11, are mounted the cutters and their operating mechanism designated by the character "B", and the power transmitting mechanism "C".

The carriage "A" consists of a supporting frame 15, reciprocably mounted on guideways 16 and 17, on the bed plate 10, the guideway 17 being positioned close to the bed plate to admit of the use of a blank of large diameter. Upon the frame 15 are bearings 18, 19 and 20, in which is rotatably mounted the work or blank carrying shaft 21. A shaft 22 is rotatably mounted in bearings in the bed plate 10, for rotation by means of a crank wheel or the like, 23. The shaft is threaded substantially throughout its length, as shown at 24, and has a threaded connection with the supporting standard 15, so that upon rotation of the shaft the entire carriage "A" is moved longitudinally of the bed plate, in order to present the work to the cutters. An index wheel 25, may be provided upon the shaft 22, with which a pointer 26 upon the frame may co-operate in order to properly gauge the extent to which the work is moved toward the cutters, so as to properly regulate the depth of the cut made in the peripheral face of the blank.

A blank is shown at 27, mounted rigidly upon the shaft 21, the right hand side of the blank being lodged against the edges of L shaped arms 29, radially adjustable upon a plate 30, having an integral hub 31 rigidly mounted upon the shaft 21. A nut 32 threaded upon the shaft 21, upon the side of the blank, opposite the L shaped arms 29, forces the blank against these arms and holds it rigidly in position. Upon the right hand end of the shaft 21 is secured a worm wheel 33, shown in dotted lines within a guard or casing 34, the teeth of the worm wheel being engaged by a worm 35, upon a shaft 36.

It will be noted that the bearing standard 20 is removably mounted by means of bolts or the like 37, upon the carriage standard 15, so that the blank 27 may be placed upon and removed from the shaft 21.

Figure 5:
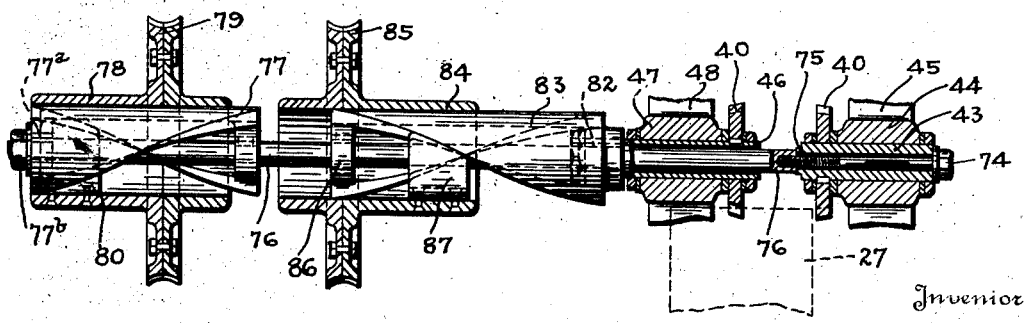
Fig. 5 is a sectional view through the cutter spindle, on line 5—5 of Fig. 2.

In the preferred mechanism shown in the drawings, I employ cutters in the form of pinions or gears, as shown at 40 in Fig. 15. It will be noted that the teeth 41 upon the periphery of the cutters, are of helical form and will be of substantially the same shape in cross section as the teeth to be cut on the blank. In cutting double helical gears, I prefer to use two of these cutters, as shown, for instance, in Figs. 2 and 5, the cutters being similar in shape except that they are oppositely formed so as to provide right and left hand cutters respectively, and are positioned opposite each other so that their cutting edges lie in opposed relation.

In cutting continuous herringbone teeth, the cutters should finish their respective strokes substantially on the same line which should preferably be substantially in a plane through a central peripheral line on the gear face. In other words, the cutting edge of each tooth at the completion of the operative stroke of the cutter should lie substantially in a plane, through the center of the gear blank and transverse to the axis thereof. By mechanism to be hereinafter described, I have arranged to so control the cutters that the cutting stroke may cease at the proper time, and I will now describe the contour of the teeth, which I deem preferable to effect the cutting of continuous herringbone teeth of true outline throughout their entire length, even to the apices or meeting edges of the teeth, where the angles should be sharply defined and the metal cleanly cut out, avoiding, however, the fouling by one cutter of the teeth cut by the other.

As shown in Figs. 15$^B$ to 15$^E$ of the drawings, the cutting edges of each of the teeth, which are designated by the reference characters 41$^a$, 41$^b$, 41$^c$, 41$^d$ and 41$^e$, and which constitute substantially the entire outline of the end face of the tooth, all lie in substantially the same plane. This plane as shown in Fig. 15$^B$ is substantially parallel to the side of the cutter pinion or a plane at right angles to the shaft, upon which the pinion is mounted, and such an arrangement will, as is obvious, obviate the disadvantageous effect of having one edge of the cutter in advance of the other in its reciprocating movement, as would be the case if the end face of the tooth was in a plane normal to the sides thereof.

It will be apparent, however, that if the entire end face of the tooth constituted a plane surface transverse to the axis of the cutter pinion, the cutting edge 41$^a$ would be formed by two planes meeting at an angle considerably less than a right angle, the difference being determined by the helical angle of the cutter teeth and the cutting edge 41$^e$ would be formed by two planes meeting at an angle considerably greater than a right angle. To obviate this disadvantage, I have formed the end face of each of the cutter teeth of such contour that it consists of two substantially plane surfaces 41$^f$ and 41$^g$, which meet the plane of the upper portion or crown of the gear tooth in the edges 41$^b$ and 41$^d$, and which are joined by a shoulder 41$^h$, which is of considerable width adjacent the base of the tooth and tapers toward the apex thereof until it finally runs out. This formation does not, however, interfere with the arrangement of having the cutting edges all in substantially the same plane transverse to the axis of the cutter, for as clearly shown in Fig. 15$^D$, the surface 41$^f$ lies in a plane, which is only slightly less than normal to the side of the tooth, while the surface 41$^g$ is cut back to make approximately the same angle with the adjacent side of the tooth. A relief cut is made to provide the relief surface 41$^m$ which runs out toward the root or base of the tooth and which at the crown, terminates in the cutting edge 41$^c$, the latter serving to join the edges 41$^b$ and 41$^d$.

The edge 41$^a$ is the forward cutting edge of the gear tooth, or that edge which first comes in contact with the blank during the generating rotary movement of the blank and cutters, which takes place during the cutting operation. It is this edge of each of the cutter teeth that moves into and cleans out the apices of the teeth cut in the blank, and as shown in Fig. 15$^F$ the advancing movement of the cutter ceases when this edge, which as stated, is in a plane transverse to the blank axis, arrives at the center line of the blank, so as not to foul the other half of the gear tooth formed by the other cutter. As will also be apparent by reference to this figure of the drawings, the edge 41$^e$ may be slightly in advance of the edge 41$^a$, but as this is the edge adjacent the exterior angles at the apices of the teeth, there will be no danger of this cutting edge fouling the gear tooth on the other half of the blank.

The plane of contact between the cutting edge of one of the cutter teeth, and the blank, is thus substantially a plane at right angles to the axis of the blank and oblique to the general direction of the gear teeth, or the direction of the furrows cut in the gear blank, and likewise oblique to the path of travel of the cutter tooth itself.

Figure 4:
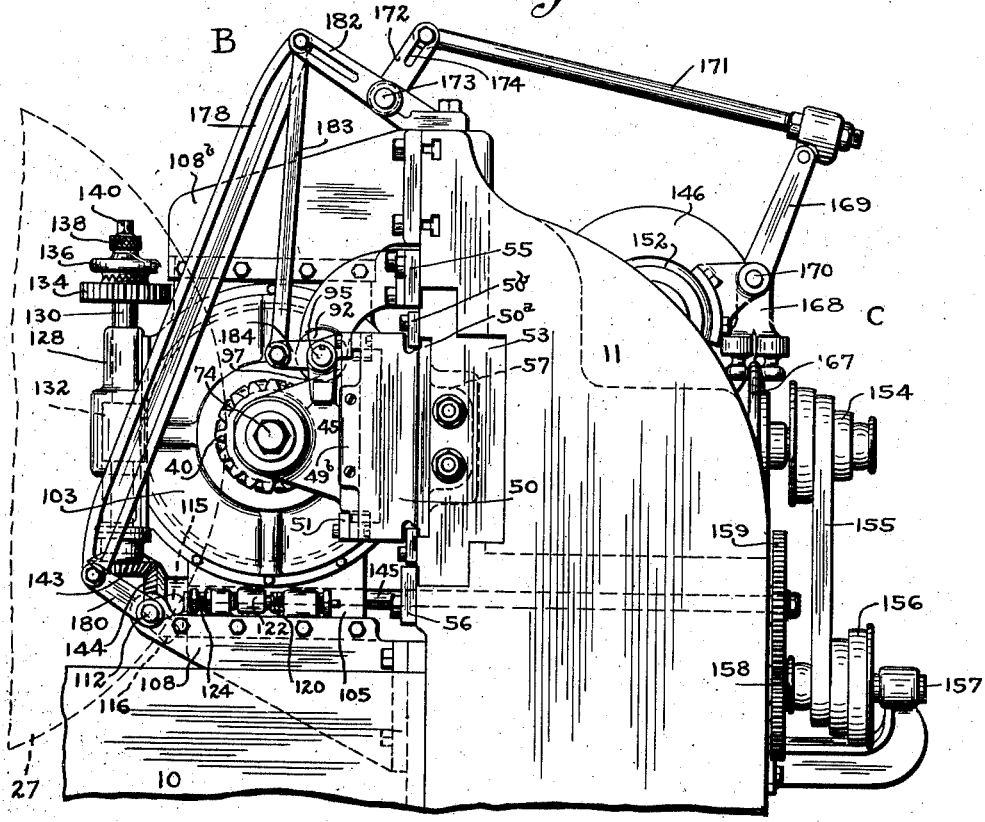
Fig. 4 is an enlarged side elevational view of the cutter spindle and associated parts, taken from the side opposite that of Fig. 3.

As shown in the drawings, these cutters have four distinct movements. The first of these to be described is their reciprocatory movement across the face of the blank. As shown more especially in Fig. 5, the right hand cutter 40 is rigidly mounted upon a sleeve 43, the sleeve being rotatably carried within a bearing 44, of a cutter carriage 45. The left hand cutter is similarly keyed to a sleeve 46, rotatably mounted in a bearing 47, of a second cutter carriage 48. The cutter carriages 45 and 48 are movably mounted in guideways 49, in blocks 50, in which guideways the carriages have a limited movement between end abutments 49$^a$ and 49$^b$ of the guide ways. The carriages 45 and 48 are retained in place in the guide ways by means of plates 51 which overlie the upper and lower edges of the carriage bases 52. The supporting blocks 50 are adjustably mounted in a main carriage slide 53, reciprocably mounted in the rear standard 11. This slide is shown more particularly in Figs. 4 and 7, and is secured in the guide way 54 in the standard by means of upper and lower plates 55 and 56. The slide in turn is provided with a guide way 50$^a$ in which the blocks 50 are slidably secured by means of the overhanging plates 50$^b$.

As shown in Figs. 6 and 7, the left hand carriage block is provided with a number of rearwardly projecting lugs 57, the right hand carriage block being provided with a similar set of lugs 58. Each of the lugs 57 is provided with a threaded opening 59, in which is engaged a threaded rod 60 rotatably mounted at its opposite ends in the main carriage slide 53, and with a larger opening 61, through which loosely passes a threaded rod 62, the latter rod being rotatably mounted in the slide and threadedly engaged with opening 63 in the lugs 58. The lugs 58 are also provided with openings through which the rod 60 loosely passes. As shown at 64 and 64ª in Fig. 3, the rods 60 and 62 are provided with squared projecting ends, upon which may be used a socket wrench or the like, to rotate the rods and adjust the distance at which cutters 40 are set from each other. In this way, the cutters may be adjusted for different size blanks, as it will be obvious that in order to operate satisfactorily, the cutters must not be set closer together than a distance equal to one-half the width of the peripheral face of the blank. In other words, when one cutter is at the middle of the blank or at the extreme end of its cutting operation, the other cutter should clear the edge of the blank so that upon the return stroke a complete cut across the adjacent half of the peripheral face of the blank will be effected.

To impart a reciprocatory movement to the cutters, so that they will be moved across the face of the blank, I employ a crank 70, shown more particularly in Figs. 2 and 10 of the drawings, this crank being provided with a crank pin 71, engaged with the adjacent end of the slide 53. It will be apparent that when the crank is rotated by suitable mechanism, to be hereinafter described, the slide 53 will be reciprocated, and as this slide controls the position of the cutters through the agency of the cutter carriages 45 and 48, with their bearings 44 and 47, the cutters themselves will be given a reciprocating movement.

At the same time that the cutters are reciprocated across the face of the work, they are also given a twisting or helical motion, if it is desired to cut helical teeth upon the gear blank. The preferred mechanism for imparting this motion to the cutters will now be described.

The sleeve 43, upon which the right hand cutter 40 is mounted, is secured by means of a bolt 74 and clutch fingers 75, to the end of a spindle or shaft 76, this spindle passing through the sleeve 46 of the left hand cutter and having secured upon its left hand end a helical guide 77, by means of the key 77ª and a nut 77ᵇ threaded upon the end of the shaft. The helical guide 77 is slidably mounted within the hollow hub or sleeve 78 of a worm wheel 79, and to this hub is secured a helical nut 80, co-operating with the helical sleeve or guide 77.

Likewise, the sleeve 46 upon which is rigidly mounted the left hand cutter, is keyed as shown at 82, in Fig. 14, to the right hand end of a helical guide 83, slidably mounted in the hollow hub 84, of a second worm wheel 85. A helical guiding nut 87, similar to the nut 80, is secured upon the inner surface of the hollow hub 84.

It will be noted that the shaft 76 not only passes loosely through the sleeve 46, but also passes loosely through a collar 86 in the rear end of the helical guide 83, within the hub 84. As will be hereinafter explained, the worm wheels 79 and 85 are secured against movement in a direction longitudinally of the shaft 76, and the helical guiding nuts 80 and 87 secured to the hubs of these wheels are likewise fixed against such movement. It will be obvious, therefore, that when the slide 53 is reciprocated, carrying with it the cutter carriage 45 and 48, and the helical guides 77 and 83, that the sleeves 43 and 46 upon which the cutters are mounted, will, due to the camming action of the guiding nuts 80 and 87 upon the helical sleeves 77 and 83, impart to the cutters a twisting helical motion as they are reciprocated across the face of the work. The cutters will, of course, be twisted or moved helically in one direction during the operative or cutting stroke of the cutters, and will be moved in the opposite direction during an inoperative stroke, so that the teeth of the cutters will be properly backed out of the helical grooves which have been cut.

It has been found desirable, particularly in cutting straight gears and in cutting gears in which the angle of the helix is relatively small, to provide a way to relieve each of the cutters at the end of each operative stroke so that when the cutter is being backed out from the work, the cutting edge will not drag thereupon. The means by which this is accomplished will now be described.

As has been previously described, the cutter carriages 45 and 48, are mounted in guide ways in the blocks 50. As shown in Fig. 6, these guide ways are inclined relatively to the axis of the cutters and as the carriages have a limited movement longitudinally of the guide ways, it will be apparent that the carriages and thus the cutters, may be moved toward and away from the work to a limited extent. As shown in Fig. 6, the left hand cutter is practically at the end of its operative stroke, and the carriage 48 is at the left hand end of the corresponding guide way 49, against the abutment 49ᵇ, or in that position in which the cutter is forced against the work to the greatest extent. The carriage is urged to this position by means of a spring 90, which reacts against the abutment 49ª and the carriage 45 is likewise urged toward the abutment 49ᵇ of its guide way, by means of a similar spring 91. With the parts in the position shown in Fig. 6, it will be necessary to provide some means to force the carriage 48 to the right, against the tension of the spring 90, in order to move the shaft of the left hand cutter away from the work, so as to relieve this cutter upon the return or movement toward the left, which is just about to begin. To effect this movement, I have mounted in the bearing 92, upon the main frame, and bearings 93 and 94 upon the upper plates 51, a shaft 95. To this shaft are keyed a pair of camming fingers 96 and 97 adjacent the bearings 93 and 94, the camming fingers being attached to these bearings so that they are moved longitudinally of the shaft 95, as the cutter carriages and cutters are reciprocated. As shown more particularly in Figs. 11 and 12, the camming finger 96 is provided with a cam surface 98 coacting with the complemental cam lug 99, which may be integrally formed with the carriage 48 to urge this carriage against the abutment 49ª, against the action of the spring 90, when the shaft 95 is oscillated. It will, of course, be obvious that when the shaft is returned to its original position, the carriage 48 will be again moved against the abutment 49ᵇ by the spring 90. Likewise, the cam finger 97 is provided with a camming surface 100, co-acting with a cam lug 101 on the carriage 45, to force this carriage away from the work against the action of the spring 91.

As shown in Fig. 11, the cutters are being moved toward the right and it will be noted that the left hand cutter, which is accomplishing its operative stroke, is being held closely against the work, while the right hand cutter, which is being backed out, is relieved or being held slightly away from the work. In Fig. 12, where the movement of the cutters is in the opposite direction, the positions are reversed and the left hand cutter is relieved, while the right hand cutter is held closely against the blank.

It will be obvious that in the illustrated embodiment of the invention, a translatory relieving movement is imparted to the cutters, the term translatory being used to describe a movement in which all points of the moving body move in parallel straight lines, as distinguished from a rotative or pivotal movement.

It will be apparent that when the cutters are moved toward and away from the work, in order to relieve them upon their inoperative movements, provision must be made for permitting corresponding movements of the shafts upon which these cutters are operated. The shaft 76 of the right hand cutter, which passes through the sleeve 46, which supports the left hand cutter, is provided with sufficient clearance within this sleeve, to permit the slight bodily movement which is necessary for clearance, and similar movement is also permitted within the collar 86. The helical guides 77 and 83 are, however, closely fitted within the hubs 78 and 84 of the worm wheels 79 and 85, and it is, therefore, necessary to provide for a bodily movement of these wheels. For this purpose, the wheels are mounted within casings 102 and 103, shown more particularly in Fig. 14, which casings are provided at their upper and lower portions with guiding tongues 104 and 105, mounted in guideways 106 and 107, in upper and lower supports 108, 108ª and 108ᵇ, carried by the main frame. By referring to Fig. 8, it will be apparent that the casings 102 and 103 will thus have a limited movement in the guideways 106 and 107, toward and from the rear standard 11. These casings 102 and 103, are provided with hub portions 109 and 110, in which the gear hubs 78 and 84 are rotatably mounted. To move the casings toward the standard 11, when the cutters are relieved from the work, short shafts 111 and 112 are mounted in journals 113 and 114, upon the lower support 108 and to these shafts are secured cam fingers 115 and 116, adapted to engage projections 117 and 118, upon the casings 102 and 103. The shafts 111 and 112 are oscillated by mechanism to be hereinafter described and as these shafts are simultaneously operated in the same direction, the cams 115 and 116 are disposed upon these shafts at an angle of approximately 90 degrees to each other. The return movement of the casings 102 and 103, is accomplished by means of spring pressed plungers 119 and 120, which act against lugs 121 and 122 on the respective casings. The return movement of these casings is limited by stop screws 123 and 124, which are adjustable in lugs upon the support 108.

Having now described the mechanism by which are imparted to the cutters their reciprocatory movement across the face of the work, their bodily movement by which they are relieved at the end of the cutting stroke, and their twisting movement by which they are enabled to cut teeth of helical shape, I will now describe the mechanism which imparts to the cutters, a continuous rotary motion of the same peripheral velocity as that of the blank, due to the action of the worm wheel 33 and worm 35.

In front of the worm wheel casings 102 and 103 are provided worm casings 127 and 128, communicating with the first named casings. These latter casings are provided with vertically disposed bearings, in which are mounted shafts 129 and 130. Upon these shafts are secured the worms 131 and 132, the teeth of which engage the teeth of the worm wheels 79 and 85, respectively. The upper ends of the worm wheel shafts project from the casings and upon the projecting ends of these shafts are loosely mounted pinions 133 and 134. These pinions are engaged with the shafts upon which they are mounted, by means of clutch members, 135 and 136, slidably keyed to the shafts 129 and 130 and adapted to be held in engagement with co-acting upper clutch faces on the hubs of the gears 133 and 134, by means of threaded nuts 137 and 138. When the nuts have been loosened and the clutch members released, the shafts 129 and 130 may be turned by means of a wrench or the like, applied to their upper squared ends 139 and 140, and by this means the cutters may be individually rotated in order to adjust them to the proper relative positions. It will, of course, be obvious that the teeth of the two cutters must be properly set, in order that they may cut continuous double helical teeth on the gear blank. Between the shafts 129 and 130 is mounted in suitable journals, a third vertical shaft 141 and to this shaft is secured, adjacent its upper end, a spur pinion 142, the teeth of which are in engagement with those of the gears 133 and 134. The shaft 141 is provided at its lower end with a bevel gear 143, the teeth of which mesh with those of a bevel gear 144, upon a shaft 145, shown more particularly in Fig. 10. When the machine is in operation, the shaft 145 is continuously rotated by means to be hereinafter described, and this rotating movement is transmitted through the shaft 141, and the spur pinion 142 to the gears 133 and 134, shafts 129 and 130 and through the worms 131 and 132 to the worm wheels 79 and 85, and thence to the cutters.

Power is supplied to the machine in the embodiment shown in the drawings, by means of a pulley 146, secured upon a shaft 147, rotatably mounted in journals on the standard 11, and in a bracket 148 secured to this standard. As shown more particularly in Figs. 2 and 10, a worm 149 is secured upon a shaft 147, and is in engagement with a worm wheel 150, secured upon a shaft 151. As shown in Fig. 10, the shaft 151 extends longitudinally of the machine, and its ends project without the journal casing 152, in which it is mounted. To one of the projecting ends of this shaft is secured the crank 70, which operates the slide 53. It is desirable in cutting gears of different widths, to be able to adjust the throw of the slide 53, and to this end, the crank pin 71 may be adjustably mounted upon the crank 70, in any well known way, so that various lengths of movement may be arranged for. I have shown the crank pin slidably mounted in a slot in the face of the crank 70, and adjustable in this slot by means of a threaded rod 153, mounted within the slot in the crank wheel.

This particular feature is also shown in my prior Patent No. 1,323,120, granted November 25, 1919.

Upon the other end of the shaft 151, is mounted a pulley 154, about which is passed a belt 155, which also passes about a pulley 156, secured upon a shaft 157, rotatably mounted at the lower portion of the standard 11. Upon the shaft 157 is mounted a pinion 158, which meshes with a gear 159 on the projecting end of the shaft 145 to actuate the latter. The teeth of the pinion 158 also mesh with the teeth of the gear 160, mounted on a stud shaft 161, upon the rear of the standard 11, and to the face of this gear is secured a pinion 162, meshing with a pinion 163 secured to a shaft 164, provided with a bevel gear 165, upon its opposite end and suitably journaled upon the standard 11. The gear 165 may be connected by suitable change gearing, designated generally by the numeral 166, with the shaft 36, in order that this shaft may be continuously rotated upon rotation of the shaft 164, in order to actuate the worm 35 and worm wheel 33, upon the shaft 21, which carries the gear blank. The gear ratio is properly adjusted to rotate the blank at the same peripheral speed as that of the cutters, as has been heretofore stated.

In order that the cutters and their operating mechanism may be given a bodily movement at the proper time, so that the cutters may be relieved at the end of their operative movements, a double acting cam disk 167, is secured upon the shaft 151, as shown in Fig. 10. This disk is engaged at its opposite faces with the bifurcated end 168 of a lever 169, pivoted at 170 upon the main frame. It will be apparent that upon the continued rotation of the shaft 151, the lever 169 will be rocked first in one direction and then in the other, these movements being imparted to it at the end of each half revolution of the shaft.

The lever 169 is connected by a link 171 to a crank arm 172, secured upon a rock shaft 173, mounted in bearings upon the standards 11. The crank arm 172 may be slotted as shown at 174, in order that the throw of this arm and the angle of oscillation of the shaft 173, may be adjusted. Upon the rock shaft 173 are mounted a pair of crank arms 175 and 176 to which are adjustably connected by means of a pin and slot arrangement, links 177 and 178 pivotally connected at their lower ends with crank arms 179 and 180, secured respectively to shafts 111 and 112, upon which are mounted the cam fingers 115 and 116, which actuate the worm wheel casings 102 and 103. To the shaft 173 is also secured a crank arm 182, connected by a link 183 to a crank arm 184, secured upon the shaft 95.

It will, of course, be obvious that at the same time that the bodily relieving movement is given to one of the cutters, the corresponding worm wheel casing 102 or 103 should also be given its bodily movement in the same direction. As this relieving movement is imparted to the cutters by the oscillation of the shaft 95, and as the bodily movement is imparted to the worm wheel casings by the oscillation of the shafts 111 and 112, respectively, and as these shafts are all oscillated upon the oscillation of the shaft 173, which in turn is actuated by the cam 167, it will be apparent that all of these movements will take place synchronously and at the proper time, at the end of each half revolution of the cam 167 and shaft 151.

The operation of the machine will now be briefly described;

The blank is placed upon the shaft 21, with the side thereof abutting the edges of the adjustable L shaped guides 29. By means of the crank 23 and the threaded rod connected thereto, the work carriage 15 is then moved bodily toward the cutters. The worm 35 during this movement sliding upon the shaft 36. In setting up the work to the cutters, the shaft 36 may be disconnected from the shaft 164 by any desired means, such as disconnecting the gearing 166 and the machine may be set in operation by applying power to the main pulley 146. The work is then set up until it is barely marked by the cutters 40, and the machine may then be stopped in order that various adjustments may be made. As will be hereinafter explained, the cutters due to their twisting helical motion will first mark the blank at central portion thereof, as shown in Fig. 17. The micrometer dial 25 is then set so that at the appointed time the blank may be set further toward the work, in order that the correct depth of tooth may be secured.

When the work is barely marked by the cutters, the clutches 135 and 136 may be disconnected, and the worm wheels 79 and 85, and therefore the cutters may be rotated by means of wrenches applied to the squared ends 139 and 140 of the shafts 129 and 130, so that the teeth of the cutters will register correctly together as is, of course, necessary in cutting double helical gears. The clutches are then screwed down so that the driving gears 133 and 134 are again engaged.

For cutting continuous teeth, it is, of course, necessary for the cutters to finish their stroke upon the same line, i. e., at the center of the face of the blank and for this purpose, it is necessary, at this time, to adjust the blocks 50 along the threaded shafts 60 and 62. This adjustment is made with the crank pin 71 on dead center and the throw of the crank is then properly regulated by adjusting the crank pin within the slide in the face of the crank disk, until the cutters will be reciprocated to the proper extent to clear the work at the outer ends of their strokes and to finish their cutting strokes upon the same line, at the center of the face of the blank.

The shaft 36 may again be connected with its drive gearing and the device again set into operation. The carriage carrying the blank is again moved gradually toward the work by means of the crank 23, the movement now being gauged by the micrometer dial 25, so that the work may be set up in proper relation to the cutters, in order that the latter may cut a tooth of the required depth.

As will be obvious, the teeth of the cutters, due to the twisting helical motion of the latter imparted by the helical guides 77 and 83 and cooperating nuts 80 and 87, will not at the beginning of the operation mark and cut the surface of the blank across its entire face, the cut taking place at the point upon the surface of the blank which lies in a plane passing through the axes of the blank and cutter, or, in other words, where the apex of a tooth is tangent to the surface of the blank. Due to the twisting movements of the cutters, one of the teeth which, for example, is tangent to the blank at the edge thereof, during the first part of the stroke, will be rotated toward the observer, as shown in Fig. 17, and will, therefore, be moved out of contact with the blank before the stroke is completed. Likewise, a following cutter tooth, which will not engage the blank at the beginning of the stroke, will engage it during the latter part of the stroke, or at a point adjacent the center of the blank, due to the fact that the helical motion imparted to the cutter brings it to a position in the plane passing through the axes of the blank and cutter where such engagement takes place. In other words, the teeth first engage the blank when they are in the plane passing through the axes of the cutter and blank, and as their helical motion carries them across or out of this plane they will not at first mark the blank across the full width of the face. As the operation progresses the cut may become so deep at one point of the gear that a continuous cut across one-half the face of the blank will be made during a single stroke of the cutter before the tooth "runs out" of the groove being cut. It will be understood, however, that such a cut will be considerably deeper in one place than another, depending upon the direction of the rotating feeding movement of the cutter and blank. When the feeding motion takes place in the direction shown by the arrows in Figs. 23 and 24 of the drawings, each tooth will be formed from the center of the blank outwardly and, as shown in these figures, the partially formed teeth will be deeper at the center of the blank than at the edge.

It will be understood that while the teeth make their deepest incisions at a point on the blank directly opposite the work-shaft, or in a plane passing through the axes of the cutter and blank, the rotative feeding movement of the cutter and blank will bring each point on the gear blank into the zone where the maximum penetration of the cutter tooth into the blank takes place, or where the deepest cut is made; and that, while the cutter only notches the blank at the central part thereof at the beginning of a new tooth, the completion of the cutting of such a tooth will be left to the action of the cutter teeth during successive strokes of the cutter while the rotative feeding motion referred to is effected.

This rotative feeding motion of the cutter and blank should not be confused with the helical twist imparted to the cutter by the helical guides and the cooperating guiding nuts, which alone determines the helical path of the cutter on the blank and the helical angle of the formed tooth. The feeding motion is merely to bring each part of the blank into the zone of action of the cutters, and as the blank and cutter move at the same peripheral speeds as far as this motion is concerned, the helical path of the cutter is exactly the same as though the feeding motion were stopped. It also will be obvious that each cutter tooth reciprocates in one groove in the gear blank, and never operates in another groove until the cutter has made a complete revolution, the teeth of the cutter meshing with the formed teeth in the blank in a manner similar to the meshing of the teeth of a gear and pinion. Due to the relatively slow rotative feeding movements of the cutter and gear, as compared with the speed of reciprocation of the cutters, each cutter tooth will be given a plurality of strokes in the groove being cut in the blank while the latter is passing through the zone of operation wherein the cutting movement takes place.

When the cutters have reached the limit of their operative strokes, they are moved bodily away from the work in order that they may be relieved upon the return strokes, as hereinbefore explained. It will be understood, that the reciprocating movement of the blocks 50, carried by the main slide 53, is imparted to the cutter carriages 45 and 48 by the engagement of these carriages with the abutments 49ª and 49ᵇ, of the inclined guideways 49, in which the carriages are mounted. The action of the camming fingers 96 and 97 is so timed and adjusted that when the cutters have reached the end of their operative strokes, the respective cams will come into action, and while not necessarily moving the cutter carriages to increase the length of the cutting stroke, they will preferably hold the cutter carriages against a return movement until the blocks have been moved sufficiently to cause the carriages to rest against the inner abutments 49ª of the guideways 49. For instance, when the left hand cutter is, as shown in Fig. 6, substantially at the center of the blank and is about to begin its return inoperative stroke toward the left, the cam 96 will come into action against the coacting cam surface 99, and will tend to move the carriage 48 to the right relative to the block 50, at approximately the same speed longitudinally of the shaft 95, that this shaft and the main carriage slide 53 is being moved toward the left. In other words, the carriage 48, being urged toward the right, as shown in Fig. 6, against the spring 90 at the same velocity as the main slide is being moved toward the left, will remain in a stationary position relative to the work until the limit of the action of the cam 96 has been reached, when the carriage 48 will have reached approximately the opposite side of the guideway 49, where it will be moved toward the left by the abutment 49ª of the block 50. This movement of the carriage 48, in the inclined guideway 49 will, of course, result in the cutter being given a bodily movement in a direction away from the work and it will thus be relieved from the work on its return stroke. It will be understood, however, that, viewed with relation to the fixed bed of the machine, the carriage 48 is held in a stationary position and the block 50 moved relatively thereto by the slide 53. As the relief of the cutters, however, is accomplished by a relative movement of the carriage 48 and block 50, a reverse arrangement may be provided wherein the carriage may be moved to the right, and the block 50 held stationary without departing from the principle of my invention.

When the parts have been properly adjusted, as described above and the machine set in operation, the cutting of a gear will proceed continuously as shown more or less diagrammatically in Figs. 19 to 24, until the operation is completed. If desired, the machine may be kept in operation and the cutters made to go over the work a second time, in order that the gear teeth may be properly and correctly trimmed by the cutters at a time when the latter meet with very little resistance and may, therefore, make a truer cut.

The helical movement imparted to the cutters causes them to follow the lead of the gear to be cut, and if straight teeth are to be cut, it will, of course, be necessary to use straight guides.

The helix angle of the gear teeth is, of course, determined by the helical guides secured to the cutter spindles, although this angle may be varied to some extent by the size of the cutters used. For instance, I prefer to adopt a helix angle of 30°, but by using larger or smaller cutters, this angle may be varied approximately 5° more or less, than the preferred angle specified. In other words, by varying the size of the cutters, I may secure a helix angle of from 25° to 35°, for the gear teeth.

The machine herein described has a very considerable scope of utility so far as concerns the dimensions of the gears that can be cut thereby. Fig. 2, for example, shows the machine in process of cutting a large gear several feet in diameter, and Figs. 19 to 26 show the production of a pinion of say 2" diameter. A typical example of marine turbine gears cut by the method herein described, is as follows:

Transmitting 2500 H. P. with the primary pinion running at 4800 R. P. M. the smallest pinion of the set was of 5 in. diameter, 14 in. face and 5 diametral pitch, while the largest was 50 in. in diameter, 18 in. face and 3 diametral pitch. With a machine such as herein described, a 0.5 per cent carbon steel pinion of 14 teeth, 5 diametral pitch and 8 in. wide, can be cut in about one hour. Wheels of cast iron, 6 in. wide and 45 in. in diameter, take about 7 hours. Cast steel wheels 50 in. in diameter and of 16 in. face and 3 diametral pitch are cut in 14 hours. Rolling-mill pinions, integral with 9 in. shaft, of 0.7 Mn and 0.5 per cent carbon steel, 25 teeth of 1¾ in. pitch take about 9 hours each. 48 in. turbine reduction gears with 18 in. face, of a maximum degree of accuracy take about 24 hours each.

It will be obvious from the foregoing description that my improvements which relate to the generation of continuous double helical teeth on solid gear blanks do away with the cut or groove at the center line of the gear face which was an incident to the production of aligned double helical teeth prior to my invention, so that the gear can be of less size and weight while at the same time the teeth offer greater resistance to breakage and present increased bearing surfaces relatively to the size of the gear, thus providing for greater load carrying capacity in a gear of given dimensions. On the other hand, the production of continuous double helical teeth by my method is much more simple and satisfactory than the previous practice of bolting together two single helical gears to form double helical teeth without a gap or groove. By the method described, a considerable amount of latitude of the helical angle being permitted, as above described, without alteration of the helical guides, and a still further latitude being permitted, if desired, by the substitution of different helical guides, it will be obvious that I am enabled to produce gears having continuous double helical teeth that are located at a large variety of angles to the blank axis. Nevertheless, I prefer to make the tooth angle approximately 30° and have in fact adopted that as standard practice in the carrying out of the improved method, having ascertained by considerable experiment that in a large majority of cases, such angle gives the best results in actual use, owing to the fact that such angle prevents slipping so far as necessary, while retaining the full benefit of the helical principle, i. e., maintaining a continuous contact of co-operating intermeshing teeth on the pitch line and a continuous contact between the intermeshing gear elements at all times. In other words, the helical angle should amount to at least 25°, which is larger than the angle customarily found heretofore in double helical gears of various kinds, and should not exceed an upper limit of 35°, although in my experience, the 30° angle has proved to be the best of all, as best suited to the greatest number of conditions, and as best meeting the requirements in respect to continuity of action and prevention of slippage. I have, of course, taken into consideration the fact that the end thrust is increased by the employment of such a large helical angle as described; but this condition has been met or compensated for to a sufficient degree, in double helical gears produced as herein described, owing to the junction of the teeth of the two series at the median line of the face, and the fact that at the apices the teeth present the same full profile as is presented elsewhere, whereby the strength of the gear is markedly increased in comparison to prior gears of the same general class. The improved method combines with these advantages, that of permitting the production of gear tooth shapes which are very strong, without undercut, and having a full bearing surface. When the finished gear is taken out of the machine, the profile of each tooth will be found to be the same throughout the tooth length, i. e. from one side edge of the gear to the other, the apices of the helical angles being completely finished and as cleanly and as accurately cut as the remaining portions of the tooth surface, the teeth of such double helical gears having convex side faces extending from the pitch circle completely to the base circle and being true involute teeth corresponding in shape with those of the cutter. It will be apparent, however, that in some aspects of the invention the shape of the cutter is not material.

It will, of course, be obvious that while I have shown and described a preferred form of machine for carrying out my improved method, the method itself is independent of the particular device used for its performance, and may be carried out by machines other than that shown.

It will also be understood that while I have described and illustrated a preferred example of my improved method, that it is susceptible of changes and of variation, both in the precise steps performed and in the order in which these steps have been described, without departing from the spirit of the invention as set forth in the appended claims.

In this application, which is a continuation in part of my co-pending application, Serial No. 484,713, filed July 14, 1921, I make no claim to the apparatus shown and described herein for carrying out my improved method, which apparatus and certain specific features thereof form the subject matter of my co-pending applications, Serial Nos. 641,126 and 641,127 filed May 24, 1923.

What I claim is:

1. The method of cutting teeth upon a gear blank which comprises causing a cutter to traverse the peripheral face of the blank, and moving the cutter bodily and positively in a direction away from the blank at substantially right angles to the line of cut in a translatory movement to relieve it at the end of its operative stroke.

2. The method of cutting gear teeth which comprises causing a cutter to traverse the face of the gear blank, and effecting a positive and bodily movement of the cutter in a direction directly transverse to its axis to relieve it at the end of its cutting stroke.

3. The method of cutting double helical gear teeth, which comprises causing the face of the gear blank to be traversed by a pair of cutters working from opposite sides thereof, and moving each of the cutters bodily and positively in a direction transverse to the axis of the gear blank, to relieve it from the work upon its return stroke.

4. The method of cutting double helical gear teeth in a blank which comprises imparting to each of a pair of rotating cutters a reciprocating movement across the face of the gear blank, and bodily and positively withdrawing the cutter from the blank to relieve it during its inoperative stroke, the withdrawing movement of the cutters taking place in a direction directly transverse to their axes.

5. The method of cutting continuous double helical teeth in a gear blank, by the operation of a reciprocating and rotating cutting tool, which comprises imparting a relative bodily separating movement to the cutter and blank, to relieve the former during its return stroke, the separating movement taking place in a direction directly transverse to the cutter axis.

6. The method of cutting continuous double helical teeth in a gear blank which comprises causing each of a pair of cutters to traverse the gear blank for a distance substantially equal to half the width thereof, the cutters beginning their operative strokes from opposite edges of the blank, and withdrawing the cutters directly from the blank in a direction transverse to the axis thereof when they reach the center thereof for the purpose described.

7. The method of cutting double helical teeth upon a gear blank which comprises mounting a pair of cutters upon twisting shafts and causing said cutters to traverse the face of the blank in a reciprocating movement, and moving the cutters and shafts bodily to relieve the cutters from the work.

8. The method of cutting helical teeth upon a gear blank which comprises mounting a cutter upon a laterally movable twisting shaft and causing said cutter to traverse the face of the gear blank in a reciprocating movement and moving the cutter shaft as a whole in a direction transverse to its axis and away from the face of the gear blank at the end of the operative stroke of the cutter to relieve the latter from the work.

9. The method of cutting continuous double helical teeth upon a gear blank which comprises mounting each of a pair of cutters upon a twisting laterally movable shaft and causing said cutters to traverse respective peripheral halves of a gear blank from the opposite edges substantially to the center thereof, and moving the cutter shafts alternately and bodily away from the work to relieve the cutters at the end of their respective strokes.

10. The method of cutting double helical teeth in a gear blank which comprises mounting each of a pair of cutters upon a twisting and laterally and bodily movable shaft, causing said cutters to traverse the face of a gear blank in a reciprocating movement, and moving both ends of the cutter shafts bodily away from the blank at the end of the operative strokes of the respective cutters.

11. The method of cutting double helical teeth which comprises mounting each of a pair of cutters upon a shaft movable longitudinally through its bearings and guided therein for twisting movement, and causing said cutters to traverse respective peripheral halves of a gear blank while rotating said shafts in the same direction.

12. The method of cutting double helical teeth in a gear blank which comprises mounting each of a pair of cutters upon a longitudinally and bodily movable shaft, one of said shafts being hollow and having the other shaft passing therethrough, causing said cutters to traverse the face of a gear blank, and moving each shaft bodily away from the blank to relieve the cutter at the end of its operative stroke.

13. The method of cutting double helical teeth in the face of a gear blank which comprises causing a pair of cutters to traverse the face of a blank in a planing movement, while imparting to both cutters and blank a continuous feeding movement, the feeding movement imparted to the cutters being in the same direction.

14. The method of cutting continuous double helical teeth in the face of a gear blank which comprises causing a pair of cutters to traverse the face of a blank in a planing movement, while imparting to both cutters and blank a continuous feeding movement, the feeding movement imparted to the cutters being in the same direction.

15. The method of cutting continuous double helical teeth in the face of a gear blank which comprises causing a pair of cutters to traverse the face of a blank in a planing movement, while imparting to both cutters and blank a continuous rotative feeding movement, the feeding movement imparted to the cutters in the same direction.

16. The method of cutting helical gear teeth in the face of a blank which comprises imparting to a pair of twisting cutters a reciprocating movement across the face of the blank, and continuously rotating the blank and cutters to feed the work to the latter, the engaging portions of the blank and both cutters being in the same direction.

17. The method of cutting the teeth of double helical gears, which comprises moving cutting tools alternately from the blank sides to but not beyond the center of the blank face at angles to each other, to form continuous double helical teeth with finished apices.

18. The method of cutting the teeth of double helical gears, which comprises moving alternately, twisting cutting tools from the blank sides to the center of the blank face and back again in such relation to the blank face center as to form clean completely finished double helical teeth meeting each other on clearly defined angles at the face center and extending continuously with substantially the same profile across the face.

19. The method of cutting the teeth of double helical gears, which comprises moving twisting shaper tools alternately in opposite directions from the blank sides to the center of the blank face to form at the center the sharp and completely finished angles or apices of continuous herringbone teeth.

20. The method of cutting the teeth of double helical gears, which comprises sliding in opposite directions from and to the side edges of the blank face to and from the middle of the blank face, shaping cutters, while imparting a twisting action to said cutters to produce a helical cut, and controlling the cutters so that they finish the apices of continuous herringbone teeth on their cutting strokes.

21. The method of cutting the teeth of double helical gears, which comprises sliding alternately in opposite directions from the side edges of the blank face to the center, shaping cutters, while imparting a twisting action to said cutters to produce a helical cut and controlling the cutters so that they finish the apices of continuous herringbone teeth on their cutting strokes, and relieving such cutters on their return strokes by a motion which causes them to move away sharply from such apices.

22. The method of cutting the teeth of double helical gears, which comprises sliding alternately in opposite directions from the side edges of the blank face to the center, shaping cutters, while imparting a twisting action to said cutters to produce a helical cut and controlling the cutters so that they finish the apices of continuous herringbone teeth on their cutting strokes, and relieving such cutters on their return strokes by a wholly lateral non-advancing motion which causes them to move directly from such apices.

23. The method of cutting the teeth of double helical gears, which comprises moving shaper tools alternately from the side edges of the blank face to the center to cut continuous double helical teeth with finished apices, and returning such shaper tools to their initial positions, while imparting to them a relief movement that carries them directly away from the tooth apices without crossing the face center line.

24. The method of cutting the teeth of double helical gears, which comprises moving shaper tools alternately from the side edges of the blank face to the center to cut continuous double helical teeth with finished apices, and returning such shaper tools to their initial positions, while imparting to them a translatory relief movement a direction away from the blank.

25. The method of cutting the teeth of double helical gears, which comprises moving shaper tools alternately from the side edges of the blank face to the blank face center and back again a multiplicity of times, while imparting a continuous generating movement to both the blank and tools, the movement of the tools being in the same direction.

26. The method of cutting the teeth of double helical gears, which comprises moving shaper tools alternately from the side edges of the blank face to but not beyond the center line of the face and back again to form continuous double helical teeth with clean and finished apices, while imparting to the cutters on their return strokes a translatory relief movement directly away from the apices, and while imparting simultaneously to both cutters and blank a continuous generating movement.

27. The method of cutting continuous double helical teeth on a gear blank, which comprises moving in toward the center of the gear face, from opposite sides, shaping cutters that cut the teeth and clean out and finish the apices thereof, while twisting the cutters, and moving them up to but not beyond the center line, imparting a continuous generating movement to the cutters and blank, and returning the cutters to their initial positions while relieving them by a bodily relief movement which takes place concurrently with the generating movement, the generating movement being imparted to the cutters in the same direction.

28. The method of cutting helical teeth on a gear blank, which comprises moving a shaping cutter toward the center of the gear face from the side thereof until it contacts with an abutment or shoulder intermediate of the width of the face, imparting a twist to the cutter to produce a helical cut, and withdrawing such cutter directly from such abutment or shoulder, while imparting to the cutter and blank a generating movement.

29. The method of cutting the teeth of double helical gears, which comprises sliding alternately from the opposite sides of the blank face toward the center, shaping cutters, imparting a twist to the cutters to form two series of helical teeth, moving a cutter of each series up to and against a tooth of the other series to clear out the angle or apex, so that the two series meet each other and form continuous teeth, withdrawing the cutters alternately to their initial positions, and imparting a continuous generating movement to both the cutters and the blank, the engaging parts of the cutters and blanks moving in the same direction.

30. The method of cutting helical teeth on a gear blank, which comprises moving a shaping cutter toward the center of the gear face from the side thereof until it contacts with an abutment or shoulder intermediate of the width of the face, imparting a twist to the cutter to produce a helical cut and withdrawing such cutter directly from such abutment or shoulder by a translatory movement while imparting to the cutter and blank a continuous generating movement.

31. The method of cutting the teeth of double helical gears, which comprises sliding alternately from the opposite sides of the blank face toward the center, shaping cutters, imparting a twist to the cutters to form two series of helical teeth, moving a cutter of each series up to and against a tooth of the other series to clear out the angle or apex, so that the two series meet each other and form continuous teeth, withdrawing the cutters alternately to their initial positions, and imparting a continuous generating movement to both the cutters and the blank, while giving them a lateral translatory relief movement in a direction away from the blank.

32. The method of cutting the teeth of helical gears which comprises moving a cutting tool over a helical path on the blank, while maintaining the cutting edge substantially in a plane transverse to the blank axis.

33. The method of cutting teeth in a gear blank which comprises moving a toothed cutting tool across the face of the blank, while maintaining the cutting edge thereof in a plane at an oblique angle to the path of a tooth of the tool.

34. The method of forming teeth in a gear blank which comprises cutting a furrow in the face of the blank along a contact plane at an oblique angle to the direction of the furrow.

35. The method of cutting the teeth of helical gears, which comprises moving a toothed cutting tool across the face of the blank in a helical path while maintaining the cutting edge thereof in a plane at an oblique angle to the path of a tooth of the tool.

36. The method of cutting helical teeth in a gear blank, which comprises moving a toothed cutting tool in a helical path across the face of the blank while causing the cutter to contact with the blank substantially in a plane at an oblique angle to the path of the cutter tooth.

37. The method of cutting the teeth of double helical gears, which comprises moving double edged toothed cutter tools alternately from the side edges of the blank face to the center to cut double helical teeth, while maintaining cutting contact between the forward edge of each cutting tooth and the blank, in a plane oblique to the path of the tooth.

38. The method of cutting the teeth of a helical gear, which comprises moving a cutting tool across the face of the gear in a helical path, while imparting to the blank and cutter a feeding movement and maintaining cutting contact between the forward edge of the tool and the blank substantially in a plane at right angles to the axis of the blank.

39. The method of cutting the teeth of a helical gear, which comprises moving a double edged cutting tool across the face of the gear in a helical path, while imparting to the blank and cutter a feeding movement and maintaining cutting contact between the forward edge of the tool and the blank in a plane substantially at right angles to the axis of the blank.

40. The method of cutting continuous double helical teeth on a gear blank, which comprises moving cutting tools alternately from the side edges of the blank face to the center thereof over a helical path while maintaining the cutting edges of the tools substantially in planes transverse to the blank axis.

41. The method of cutting continuous double helical teeth on a gear blank, which comprises moving toothed cutting tools alternately from the side edges of the blank face to the center thereof over a helical path on the blank while maintaining the cutting edge of each cutter tooth in a plane at an oblique angle to the path of travel thereof.

42. The method of cutting continuous double helical teeth on a gear blank, which comprises cutting a helical furrow from each edge of the blank to the center thereof on a contact plane at an oblique angle to the direction of the furrow.

43. The method of cutting double helical teeth in a gear blank, which comprises moving cutting tools alternately from the side edges of the blank face to the center, while causing each cutter to contact with the blank substantially in a plane transverse to the path of the cutter.

44. The method of cutting double helical teeth in a gear blank, which comprises moving cutting tools alternately, in a helical path, from the side edges of the blank face to the center, while causing each cutter to contact with the blank substantially in a plane at right angles to the axis of the blank.

45. The method of cutting the teeth of helical gears, which comprises moving a cutting tool over a helical path on the blank, while maintaining the cutting edge in the plane transverse to the blank axis and giving the tool a translatory relief movement in a direction away from the blank at the end of the cutting stroke.

46. The method of cutting the teeth of helical gears, which comprises moving a cutting tool over a helical path on the blank and completing the cut so made in a plane at right angles to the blank axis.

47. The method of cutting the teeth of helical gears, which comprises moving a cutting tool over a helical path on the blank and completing the cut so made in a plane at right angles to the blank axis, giving the cutting tool a translatory relief movement in a direction away from the blank at the end of the cutting stroke.

48. The method of cutting the teeth of double helical gears, which comprises moving double edged cutter tools alternately from the side edges of the blank face to a median line thereon to cut double helical teeth while maintaining cutting contact between the forward edge of each cutting tool and the blank in a plane substantially at right angles to the axis of the blank, and giving the cutter a translatory relief movement in a direction away from the blank at the end of the cutting stroke.

49. The method of cutting the teeth of double helical gears, which comprises moving double edged cutter tools alternately from the side edges of the blank face to a median line thereon to cut double helical teeth, while maintaining cutting contact between the forward edge of each cutting tool and the blank in a plane substantially at right angles to the axis of the blank and giving the cutter a translatory relief movement directly away from the blank.

50. The method of cutting double helical teeth in a gear blank, which comprises moving cutter tools alternately from the side edges of the blank face to a median line thereon, while causing each cutter to contact with the blank substantially in a plane transverse to the path of the cutter, and imparting to each cutter a translatory relief movement in a direction away from the blank at the end of the cutting stroke.

51. The method of cutting helical gear teeth in a blank by means of a cutter connected to a reciprocating cutter, which comprises imparting to the slide a helical movement relative to the blank and effecting the beginning of the return movement of the slide prior to that of the cutter to effect a relief movement of the cutter from the work.

52. The method of cutting gear teeth in a blank by alternately advancing and returning a cutter over the face of the blank by means of a reciprocating slide, and prior to the beginning of the return stroke of the cutter causing a relative movement between the cutter and slide along an inclined plane to withdraw the cutters from the work, while imparting to the cutters and blanks a rotating feeding movement.

53. The method of cutting gear teeth in a blank which comprises mounting a cutter upon a reciprocating slide for relative bodily movement therebetween, moving said slide to cause the cutter to be advanced and returned over the face of the blank, imparting to the cutters and blank a rotative generating feeding movement and effecting relative movement between the cutter and slide along an inclined plane prior to the beginning of the return stroke of the cutter to withdraw it from the blank.

54. The method of cutting helical gear teeth in a blank, which comprises establishing a lost motion connection between a cutter and a reciprocating slide, reciprocating the slide to cause the cutter to be advanced and returned over the face of the blank while imparting to the cutter a helical movement, effecting relative movement between the cutter and blank in an inclined direction prior to the return stroke of the cutter to relieve it during the return stroke.

In witness whereof, I have hereunto set my hand this fifteenth day of May, 1923.

WILLIAM EDWIN SYKES.

CERTIFICATE OF CORRECTION.

Patent No. 1,750,029.                                    Granted March 11, 1930, to

WILLIAM EDWIN SYKES.

It is hereby certified that error appears in the printed specification of the above numbered patent requiring correction as follows: Page 11, line 2, claim 15, after the word "cutters" insert the word "being", and line 10, claim 16, after the word "being" insert the word "moved"; page 13, line 73, claim 52, for the word "blanks" read "blank"; and that the said Letters Patent should be read with these corrections therein that the same may conform to the record of the case in the Patent Office.

Signed and sealed this 8th day of April, A. D. 1930.

(Seal)

M. J. Moore,
Acting Commissioner of Patents.